United States Patent Office 2,940,853

Patented June 14, 1960

2,940,853

AZIDE SENSITIZED RESIN PHOTOGRAPHIC RESIST

John J. Sagura and James A. Van Allan, Rochester, N.Y., assignors to Eastman Kodak Company, Rochester, N.Y., a corporation of New Jersey No Drawing. Filed Aug. 21, 1958, Ser. No. 756,276

3 Claims. (Cl. 96—91)

This invention relates to photographic processes for various photomechanical purposes, for example, as etching resist stencils and for the production of layers which can be rendered ink-accepting in an image-wise manner and used for lithographic and similar printing processes where "greasy" inks are employed.

It is well known to employ, for making etching resists and for lithographic and similar printing processes, a light-sensitive layer, such as a layer of gelatin impregnated with potassium bichromate, which is exposed to light and is then inked all over, followed by swabbing with water which removes the ink from the portions of the layer not hardened by the exposure to light. Many variations of this process have been proposed.

It is known that aryl azides, for instance azidostyryl ketones and azidostyrylaryl azides can be used to render colloid layers, such as gelatin, casein, polyvinyl alcohol, dextrin, etc., sensitive to light, and that upon exposure, the exposed portions are thereby hardened and made water-insoluble. Such prior proposals for the use of aryl azides have been concerned with the use of aqueous coatings and the production of the stencils therefrom by washing away the unwanted portions of the layer, after exposure, with aqueous solutions. In these proposals, the aryl azides used to sensitize the layers were water-soluble.

We have now found that very valuable photomechanical images, such as stencils and the like, can be produced by employing organic solvent-soluble colloid materials, such as natural and synthetic rubbers, etc., sensitizing these with organic solvent-soluble aryl azides, and after exposure removing the unexposed parts by treatment with an organic solvent.

The use of azides such as 4,4′-diazidostilbene and p-azidobenzophenone for sensitizing the colloids is described in Hepher and Wagner U.S. application Serial No. 506,062, filed May 4, 1955, and the use of 4,4′-diazidobenzalacetone for this purpose is described in British application 12,671/57. Among the disadvantages of these prior azides are their poor solubility as shown by the fact that they are prone to deposit crystals on storage below room temperature or during the coating operation. Crystals formed during the coating operation leave imperfections or even perforations in the final resist image, and such crystallization is obviously of serious consequence. A further disadvantage is that this poor solubility limits the concentration of solids which may be included in the resist composition thereby limiting the coating thickness which may be achieved, and also making impossible the marketing of a concentrated solution to lower packaging and shipping costs.

We have found that these difficulties may be eliminated by substituting a more soluble sensitizer, e.g., 4,4′-diazidochalcone or 2,6-di-(4′-azidobenzal)-4-methylcyclohexanone, for the azides previously used to sensitize the colloid, e.g., a styrene butadiene copolymer.

The azide compounds useful in our invention are substantially insoluble in water but are soluble in ordinary organic solvents such as trichloroethylene, benzene, toluene, Stoddard's solvent, etc.

The azides which we propose to use have the following composition:

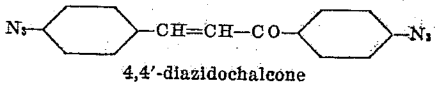

4,4′-diazidochalcone

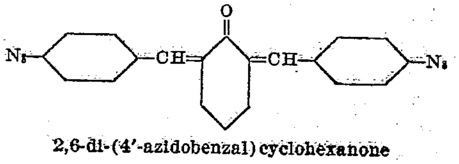

2,6-di-(4′-azidobenzal) cyclohexanone

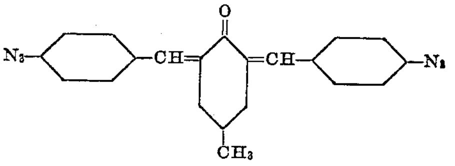

2,6-di-(4′-azidobenzal)-4-methyl cyclohexanone

Our preferred colloid carrier for the azide sensitizer is a styrene butadiene polymer such as that manufactured by Goodyear Tire and Rubber Company under the name Pliolite S5B. It is non-oxidizing; readily soluble in aromatic solvents, terpenes, esters and ketones, and is resistant to acids, alkalies, alcohol, water and grease.

The following examples illustrate the invention:

*Example 1*

A solution of 10 grams of styrene butadiene copolymer and 0.25 gram of 2,6-di-(4′-azidobenzal)-4-methylcyclohexanone in a mixture of 50 cc. of xylene and 50 cc. of methyl Cellosolve acetate was coated on a metal support by means of a plate whirler. The plate was whirled until dry. The plate was then exposed from ½ to 4 minutes with a 35-amp. carbon arc lamp at a distance of 3 feet for 2 minutes. Solvent development to remove unexposed areas was then affected in a conventional vapor degreaser or by tank development in a suitable solvent, e.g., trichloroethylene. The resulting plate with its positive resist image was found suitable for use as a lithographic plate, or the resist properties of the image could be utilized in the conventional manner to protect the image areas of the base from etching solutions.

*Example 2*

A coating was made as in Example 1, using the following composition:

| | |
|---|---|
| Styrene-butadiene copolymer ____________grams__ | 10 |
| 2,6-di-(4′-azidobenzal)-4-methyl-cyclohexanone ______________________________grams__ | 0.25 |
| Methyl Cellosolve acetate-xylene 1:1 solution __cc__ | 100 |

After whirling to dry as described above, the plate was exposed in the manner described in Example 1 and developed either in a tank-type developer using a mixture of 40 cc. of xylene and 60 cc. of Stoddard's solvent, or in a vapor degreaser using trichloroethylene.

The azides of our invention were prepared as follows:

*4,4′-diazidochalcone.*—A mixture of 36 g. of 4-azidobenzaldehyde and 40 g. of 4-azidoacetophenone in 400 ml. of alcohol was treated with 40 ml. of 25 percent caustic with good stirring. After one hour at room temperature the yellow crystalline material was collected by filtration, washed with alcohol, and dried. Yield 64 g., M.P. 125° C.

*2,6-di-(4′-azidobenzal)cyclohexanone.*—A mixture of 24 g. of cyclohexanone and 73 g. of 4-azidobenzaldehyde in 500 ml. of ethanol was treated at 30° C. with 50 ml.

of 25 percent alkali. After two hours the product was filtered off, washed with ethanol, and dried to give 63 g. of 2,6-di-(4'-azidobenzal)cyclohexanone, M.P. 140° C.

*2,6 - di - (4'-azidobenzal)-4-methyl-cyclohexanone.*—A mixture of 16.1 g. (0.1 mole) of 4-azidobenzaldehyde and 5.50 ml. (0.05 mole) of cyclohexanone in 100 ml. of methanol was treated with 5 ml. of 25 percent caustic. After standing 4 hours, the product, which had precipitated out, was collected by filtration and dried. Yield 8.8 g. (60 percent) M.P. 115–118° C. Recrystallization from benzene alcohol gave a pure product M.P. 121° C.

We claim:

1. A light-sensitive coating composition comprising a solution in an organic solvent of a rubbery styrene butadiene copolymer and an azide selected from the class consisting of 4,4'-diazidochalcone, 2,6-di-(4'-azidobenzal)-4-methylcyclohexanone and 2,6-di-(4'-azidobenzal)- cyclohexanone, said composition being adapted to produce a light-sensitive coating in which an image can be formed by exposure to light, and washing in an organic solvent.

2. The composition of claim 1 in which the azide is 2,6-di-(4'-azidobenzal)-4-methylcyclohexanone.

3. A light-sensitive photographic material comprising a support having thereon a substantially dry composition comprising a rubbery styrene-butadiene copolymer and 2,6-di-(4'-azidobenzal)-4-methylcyclohexanone, said material being adapted to produce a photographic image upon exposure to light, and washing in an organic solvent.

References Cited in the file of this patent

UNITED STATES PATENTS 2,848,328 Hepher -------------- Aug. 19, 1958